United States Patent
Russo (10) Patent No.: US 12,101,308 B2
(45) Date of Patent: Sep. 24, 2024

(54) MANAGING A SSO SESSION BY AN IDENTITY PROVIDER

(71) Applicant: Siemens Aktiengesellschaft, Munich (DE)

(72) Inventor: Francesco Russo, Arenzano (IT)

(73) Assignee: Siemens Aktiengesellschaft, Munich (DE)

( * ) Notice: Subject to any disclaimer, the term of this patent is extended or adjusted under 35 U.S.C. 154(b) by 341 days.

(21) Appl. No.: 17/438,171

(22) PCT Filed: Mar. 24, 2020

(86) PCT No.: PCT/EP2020/058165
§ 371 (c)(1),
(2) Date: Sep. 10, 2021

(87) PCT Pub. No.: WO2020/193555
PCT Pub. Date: Oct. 1, 2020

(65) Prior Publication Data
US 2022/0182372 A1 Jun. 9, 2022

(30) Foreign Application Priority Data
Mar. 25, 2019 (EP) .................................... 19164986

(51) Int. Cl.
H04L 9/40 (2022.01)
H04L 67/146 (2022.01)
(52) U.S. Cl.
CPC ........ *H04L 63/0815* (2013.01); *H04L 63/083* (2013.01); *H04L 63/102* (2013.01); *H04L 67/146* (2013.01)
(58) Field of Classification Search
CPC . H04L 63/0815; H04L 63/083; H04L 63/102; H04L 67/146; H04L 67/14; H04L 63/08; H04L 63/10
See application file for complete search history.

(56) References Cited

U.S. PATENT DOCUMENTS

| | | | |
|---|---|---|---|
| 11,063,927 B1 * | 7/2021 | Varun Mukesh | ..... H04L 67/146 |
| 2005/0154887 A1 | 7/2005 | Birk et al. | |

(Continued)

FOREIGN PATENT DOCUMENTS

| | | |
|---|---|---|
| CN | 106921721 A | 7/2017 |
| CN | 109314704 A | 2/2019 |
| GB | 2364408 A | 1/2002 |

OTHER PUBLICATIONS

Tarafder et al., "Preventing Session Hijacking using Encrypted One-Time-Cookies," 2020 Wireless Telecommunications Symposium (WTS) Year: 2020 | Conference Paper | Publisher: IEEE.*

(Continued)

*Primary Examiner* — Roderick Tolentino (74) *Attorney, Agent, or Firm* — Laurence A. Greenberg; Werner H. Stemer; Ralph E. Locher (57) ABSTRACT

A method, a system and a computer program manage a single sign on (SSO) session by an identity provider for a plurality of services. The method includes managing, by an identity provider, information on the SSO session via a cookie based protocol, and persisting a list of services of relying parties participating in same SSO session information in one session cookie and a plurality of temporary state cookies with randomly generated names. Whereby the list of session services are represented with a bit mask representation within the cookies and, whereby the plurality of temporary state cookies can be consolidated into one state cookie.

12 Claims, 4 Drawing Sheets

(56) References Cited

U.S. PATENT DOCUMENTS

| | | | |
|---|---|---|---|
| 2009/0222584 A1* | 9/2009 | Josefsberg | H04L 61/4511 |
| | | | 709/245 |
| 2010/0043067 A1* | 2/2010 | Varadhan | H04L 45/00 |
| | | | 726/13 |
| 2010/0223471 A1* | 9/2010 | Fresko | H04L 63/12 |
| | | | 713/176 |
| 2012/0151568 A1* | 6/2012 | Pieczul | H04L 63/0815 |
| | | | 726/8 |
| 2015/0092551 A1* | 4/2015 | Moisand | H04L 67/146 |
| | | | 370/235 |
| 2016/0285843 A1 | 9/2016 | Popovich et al. | |
| 2017/0099299 A1 | 4/2017 | Sutton et al. | |
| 2018/0075231 A1* | 3/2018 | Subramanian | H04L 63/0807 |
| 2018/0077143 A1* | 3/2018 | Sridharan | H04L 63/0807 |
| 2018/0077144 A1* | 3/2018 | Gangawane | H04L 63/102 |
| 2018/0081983 A1* | 3/2018 | Carru | H04L 67/5682 |

OTHER PUBLICATIONS

Alizai et al., "Key-Based Cookie-Less Session Management Framework for Application Layer Security," IEEE Access Year: 2019 | vol. 7 | Journal Article | Publisher: IEEE.*
Nordbotten N A et al, "Methods for service discovery in Bluetooth scatternets", Computer Communications, Elsevier Science Publishers BV, Amsterdam, NL, (Jul. 1, 2004), vol. 27, No. 11, doi:10.1016/J.COMCOM.2004.01.013, ISSN 0140-3664, pp. 1087-1096, XP004503638 [A] 1-11 abstract p. 1088, col. r, line 40—p. 1088, col. r, line 53.

* cited by examiner

MANAGING A SSO SESSION BY AN IDENTITY PROVIDER

BACKGROUND OF THE INVENTION

Field of the Invention

The invention relates to a method, a system and a computer program product for managing a SSO session by an identity provider for a plurality of services.

Conveniently, embodiments can also be applied to the field of industrial software and in particularly to the field of MOM.

Most recently, the term MOM (Manufacturing Operations Management) is more and more used to replace the term MES (Manufacturing Executing System).

In the field of industrial software, in order to integrate the login between different web applications which may also be delivered by different products, identity providers are used with web Single Sign On (SSO) functionalities.

Applications, known as relying parties, can ask for a login session to the identity provider and—if it exists—they can then join a global session shared between the different relying parties. When the state of the global session changes or terminates, all the relying parties receive a notification.

Relying parties are typically web applications or services in the cloud wanting to join a web SSO session and they receive authentication information from the identity provider in a claim.

In order to increase availability, identity providers are often implemented in a cluster of nodes.

In the art, the information to manage and restore the SSO session is typically stored at the server side, for example a server side session managed by the web server or persisted to an external system (e.g. SQL, distributed cache) in case of redundancy.

In such scenarios, there is the need to increase infrastructure for redundancy purposes with the related disadvantages of cost increases in terms of extra hardware and maintenance complexities.

Therefore, techniques of web SSO session management in which the session state is persisted at the client side are desirable choices.

Unfortunately, in the art, such client based techniques may experience one of more of the below challenging technical issues:
being able of reconstructing the service list when login requests are performed to different nodes;
dealing with a browser response order which is different from that of the http server;
be limited by a cookie size which cannot exceed certain thresholds.

Therefore improved techniques are desirable.

SUMMARY OF THE INVENTION

The aforementioned aim is achieved by a method, a system and a computer program product for managing a SSO session by an identity provider for a plurality of services where SSO session information is persisted at the client side via a cookie-based protocol.

The aforementioned aim is achieved by a method, a system and a computer program product for managing a SSO session by an identity provider for a plurality of services including:
a) by an identity provider, managing information on the SSO session via a cookie based protocol;
b) persisting a list of services of relying parties participating in a same SSO session information in one session cookie and a plurality of temporary state cookies with randomly generated names, whereby the list of session services are represented with a bit mask representation within the cookies; and, whereby the plurality of temporary state cookies can be consolidated into one state cookie.

In embodiments, the bit mask may be advantageously represented in a compressed format.

In embodiments, the SSO session state may conveniently be saved via cookies and can be recovered via cookies and there is no need of persistency of the SSO session state at the server side.

In embodiments, the session static information may preferably be represented as a signed ticket whereby both ticket and signature are stored in separate cookies.

In embodiments, when a new relying party joins a global SSO session, the session cookie may conveniently be updated by adding the new relying party into the list of the global session participants.

In embodiments, the information on the session state is stored on the client side at the browser.

In embodiments, needed session information is stored via cookies.

In embodiment, the list of relying party of the SSO session is persisted in one or more state cookies.

In embodiments, state cookies have randomly generated names.

In embodiments, session services are listed with a bit mask representation.

In embodiments, a plurality of state cookies are consolidated in one consolidated state cookie and temporary state cookies are deleted.

In embodiments, the bit mask may preferably be compressed.

Furthermore, a computer program element can be provided, comprising computer program code for performing steps according to the above mentioned method when loaded in a digital processor of a computing device.

Additionally, a computer program product stored on a computer usable medium can be provided, comprising computer readable program code for causing a computing device to perform the mentioned method.

In embodiments, a SSO protocol implementation uses a client side storage of the session state.

In embodiments, once a new session is created all the needed session state information are stored via cookies and sent back to the browser.

In embodiments, the needed session information is stored in the memory-cache of one node and, in case it is not present, it is possible to recover the session information from the session and state cookies.

In embodiments, a SSO protocol implementation conveniently persists the list of services of the relying parties that are participating in the same authenticated session in one or more cookies, so that the identity provider can dispatch session notifications to each relying party of the session.

In embodiments, if a valid ticket is received by the node, the web SSO session is reconstructed.

Advantageously, there is no need of having centralized session information stored on the server side in order to verify if the session is still valid and not invalidated.

When a new relying party joins the global session, the session state is updated and this new relying party is added in the list of the global session participants. This list contains the end points registered in order to receive notifications.

Examples of session requests include but are not limited to authentication, renew and logout requests.

In embodiments, the service must be registered to the whitelist.

In embodiments, the service is preferably represented within the service list within a "state" cookie with one bit in a binary mask. Hence, cookie size problems are advantageously minimized. For example, Set-Cookie: STATE=00010 the forth bit ON refers to the forth service.

In embodiments, the representation via a bit mask may be compressed by various compression techniques.

In embodiments, a base-32 encoding may conveniently be used. Hence, the size is advantageously reduced by five times so as to mitigate size issues of the http header due to the binary string representation.

In embodiments, a substring composed by all zeros may conveniently be replaced with their count. Hence, the size may also be advantageously reduced.

In embodiments, a state cookie with a randomly generated name is used to enable to persist the session state with cookies. Hence, any loss of bits due to the unpredictability of the browser response is advantageously avoided so that a cookie defined first by the server and set after in the browser does not overwrite the previous value.

With embodiments, it is provided a client side session management for web SSO identity provider with a cookie state protocol.

In embodiment, session static information (that do not change over time) are represented as a signed ticket: both ticket and signature (encoded base64) are stored in separate cookies.

In embodiments, information on the session is persisted with one session cookie and a plurality of temporary state cookies, that may then be conveniently reduced/consolidated to one state cookie.

With embodiments, the session state is saved via cookies and can be recovered via cookies.

With embodiments, there is no persistence of the session state at the server side.

With embodiments, when requesting a single sign off functionality on multiple cluster nodes there is no need of saving the state on a physical storage or in-memory cache.

With embodiments, the cookie state protocol in the Web SSO identity provider gives the possibility to persist the session state at the client side. Advantageously, it is not necessary to have a specific server infrastructure in order to manage the session.

With embodiments, installation, license and maintenance costs are reduced since in case of redundancy it is necessary to buy specific software or use the OSS equivalent.

With embodiments, scalability is improved since it is enough to add a new server in the load balancer.

The invention will now be described in preferred but not exclusive embodiments with reference to the accompanying drawings FIG. 1 to FIG. 4.

DETAILED DESCRIPTION OF THE INVENTION

Examples of relying parties may include, but are not limited to, an application SCADA, a MOM system, MES Simatic IT and/or TIA Portal.

Figure 1:
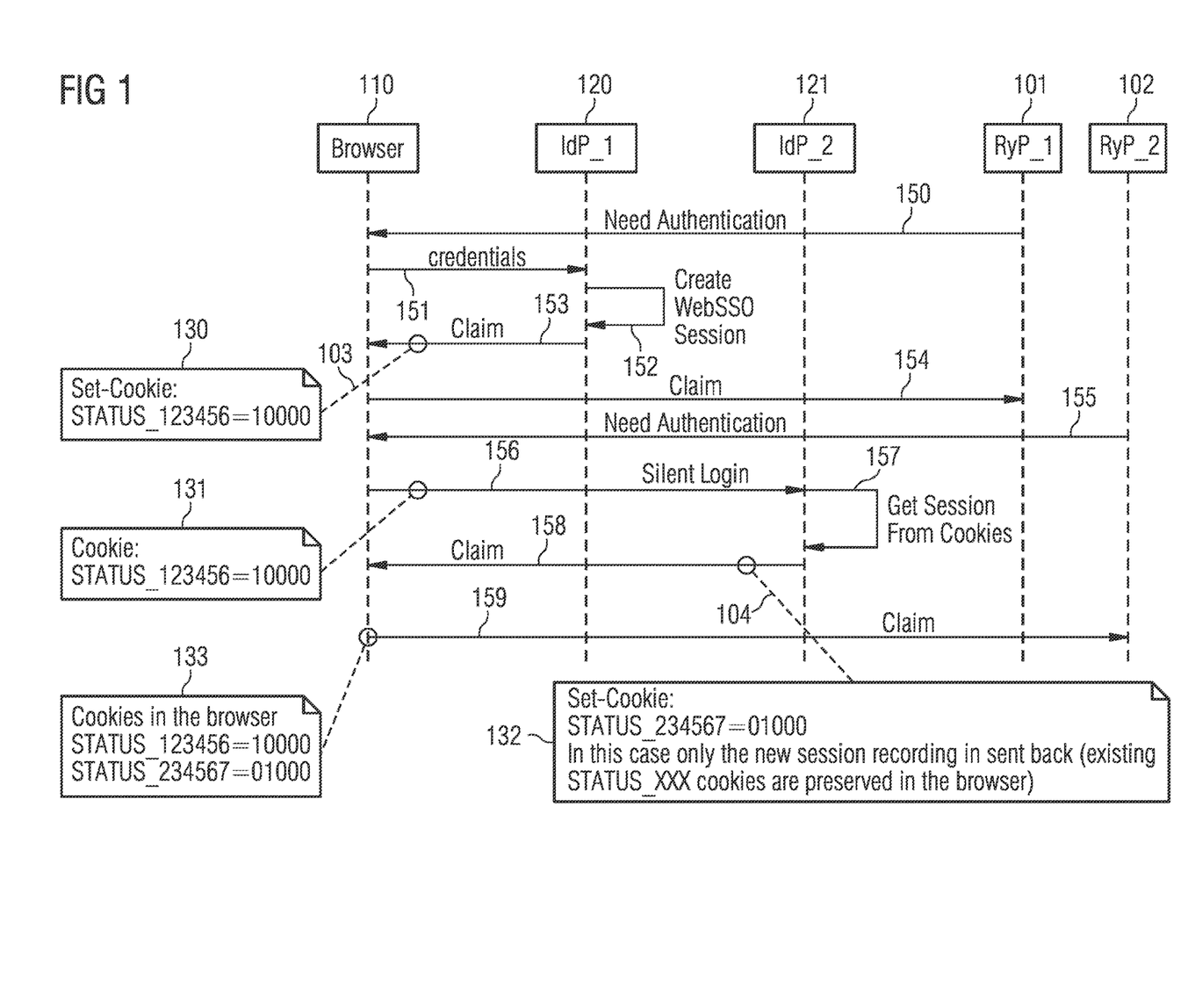
FIGS. 1-3 are diagrams of examples of information exchange flow between the browser, the identity provider nodes and the relying parties according to exemplary embodiments of the invention.

FIG. 1 is a diagram of a session creation in accordance with embodiments.

In FIG. 1, a new session first session is created for a first relying party RyP_1 101 and then a second relying party RyP_2 102 joins this web SSO session. When service 1 is registered and joins the session, the first status cookie is created 103 "STATUS_123456=10000", the first bit of the mask is ON to indicate that service 1 (the end point of relying party RyP_1) is in the session. A second status cookie "STATUS_234567=01000" (with a different random name) is created 104 when service 2 (the end point of relying party RyP_2) joins this same session. It is noted that in this simple example, the first status cookie is created for service 1 and the second status cookie is created for service 2, the skilled in the art easily understand that other options/embodiments are possible, for example the first status cookie may instead be created for service 5 (fifth bit of the mask) for relying party 5 not shown.

Figure 2:
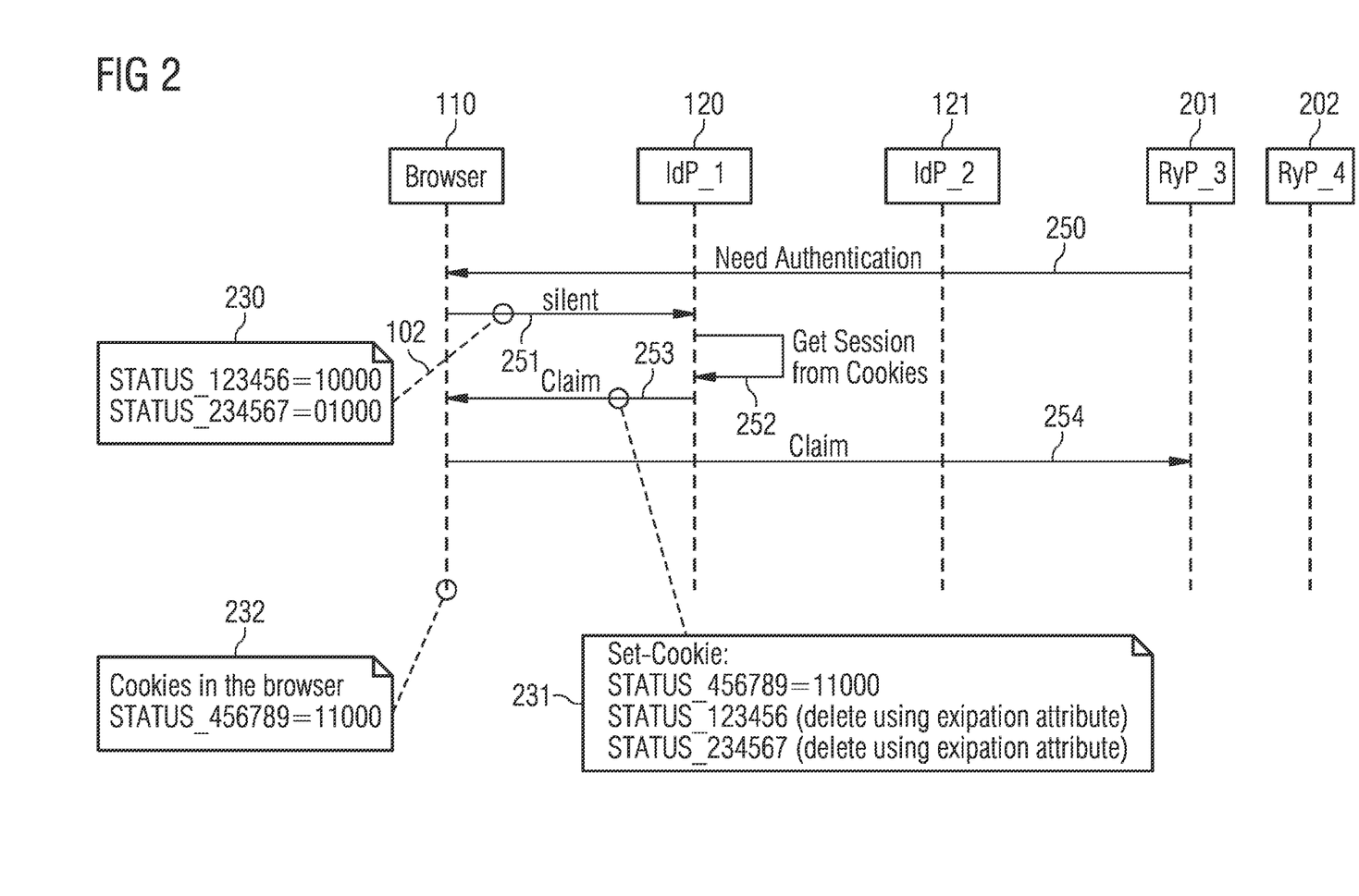

FIG. 2 is a diagram of an example of cookie consolidation in accordance with embodiments.

In FIG. 2, the first two status cookies are consolidated in one status cookie STATUS_456789=11000 where the first two bits of the bit mask are ON for relying party 1 and 2. The previous status cookies are deleted by using expiration attribute 231.

With embodiments, by consolidating the state cookies into one state cookie, size requirements are advantageously reduced. In embodiments, when there is an authentication request and more than one state cookies are received, there is a consolidation into one single state cookie. In other embodiments, other scenario may trigger cookie consolidation.

Figure 3:
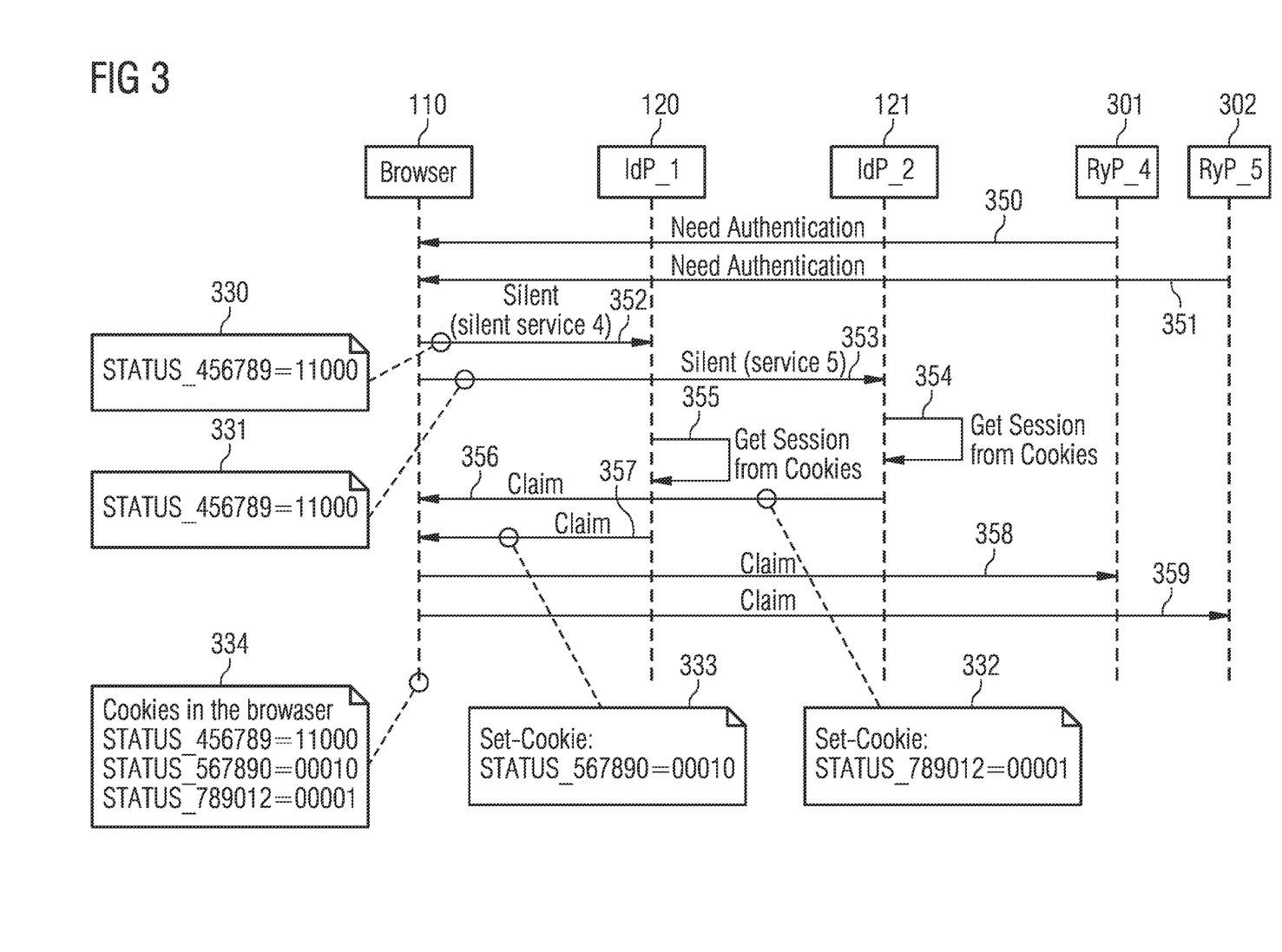

FIG. 3 is a diagram of a parallel join request (silent login) in accordance with embodiments. In FIG. 3, two parallel silent logins are sent from the browser to the identity provider: in the example they are routed to two different nodes. The status cookies are always added and no relaying party registration is lost.

Figure 4:
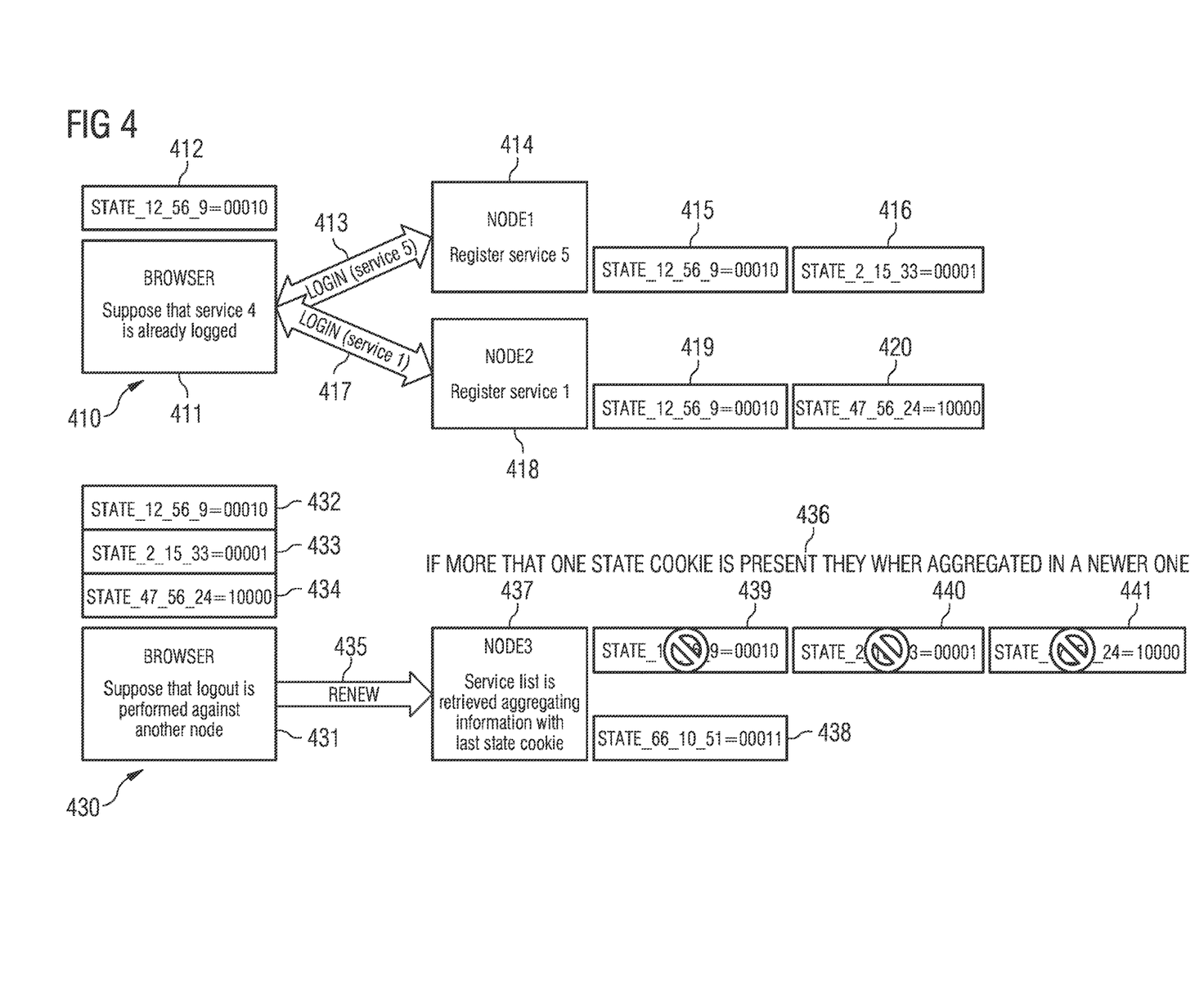
FIG. 4 is a diagram of generation of state cookies according to an exemplary embodiment.

FIG. 4 is a diagram of generation of state cookies according to an exemplary embodiment.

In the upper part 410 of FIG. 4, assume that service 4 is already logged, a browser requests a parallel login of two services service 5 and services 1 which are sent to two nodes Node 1 and Node 2 respectively by a load balancer (not shown). New state cookies are created for service 5 with the fifth bit ON and for service 1 with the first bit ON.

In the lower part 430 of FIG. 4, assume that logout is performed against another node 434, if more than one state cookie is present they are aggregated 437 in newer one, with the aggregated bit mask first, fourth and fifth bits are ON for Service 1, 4 and 5.

For example: Set-Cookie:STATE_12_56_9=00010

If simultaneous login requests are performed to different node, each of the following/successive requests sent by the browser contains all the state cookies. Advantageously, each node can gather the overall information on the service list.

In embodiments, when a new gathered cookie is added, older cookies will be removed.

In embodiment, the state cookie has a name with an initial prefix which is common (e.g. STATE) and a random part (e.g. 456789, 567890, 789012).

In embodiments, requests arriving from different nodes are sent by the browser to the http server that responds with cookie "set".

Table 1 below is an example embodiment of a session cookie format.

TABLE 1

Session Cookie format.

ticket_id → this cookie contains all the information in order to reconstruct a session information (e.g. including identity expiration, ...)
Format: <header>.<claim>.<signature>
This fields are base64 format and url encoded.
header → fixed header
{"alg":"RS256","kid":"F9AF369D12A12DEBE24922E99CFD2E15F67450E5","typ":"JWT"
}
claim → the session description
{"exp":"2018-03-26T14:51:26.4719099Z","iat":"2018-03-26T14:41:26.4719099Z","iss":"UMC Identity Provider","sub":<innerclaim>}
Innerclaim → session information
{ "issuerCommonName": "Siemens Issuing CA EE Auth 2013",
   "subject": "",
   "computerTicket": "",
   "validity": "600",
   "sessionEnd": "2018-03-27T09:02:28Z",
   "authnmethod": "pwd",
   "subjectCommonName": "root",
   "securityLevel": 80,
   "ticketUsage": "",
   "subjectAlternativeName": ""}
signature → signature of the previous fie The skilled in the art easily appreciate that other various not disclosed but advantageous embodiments of the claimed invention are possible.

None of the description in the present application should be read as implying that any particular element, step, or function is an essential element which must be included in the claim scope: the scope of patented subject matter is defined only by the allowed claims.

REFERENCE SIGNS AND TEXT OF THE FIGURES

FIG. 1:
101 RyP_1 acronym for Relying Party 1
102 RyP_2 acronym for Relying Party 2
103 creation of first status cookie
110 Browser
120 IdP_1 acronym for Identity Provider 1
121 IdP_2 acronym for Identity Provider 2
130 Set-Cookie:
   STATUS_123456=10000
131 Cookie:
   STATUS_123456=10000
132 Set-Cookie:
   STATUS_234567=01000
   In this case only the new session recording is sent back (existing STATUS XXX cookies are preserved in the browser)
133 Cookies in the browser:
   STATUS_123456=10000
   STATUS_234567=01000
150 Need Authentication
151 credentials
152 Create WebSSO Session
153 claim
154 claim
155 Need Authentication
156 Silent Login
157 Get Session From Cookies
158 claim
159 Claim FIG. 2:
110 Browser
120 IdP_1 acronym for Identity Provider 1
121 IdP_2 acronym for Identity Provider 2
201 RyP_3 acronym for Relying Party 3
202 RyP_4 acronym for Relying Party 4
230 STATUS_123456=10000
   STATUS_234567=01000
231 Set-Cookie:
   STATUS_456789=11000
   STATUS 123456 (delete using expiration attribute)
   STATUS 234567 (delete using expiration attribute)
232 Cookies in the browser:
   STATUS_456789=11000
250 Need Authentication
251 silent
252 Get Session From Cookies
253 claim
254 Claim FIG. 3:
110 Browser
120 IdP_1 acronym for Identity Provider 1
121 IdP_2 acronym for Identity Provider 2
301 RyP_3 acronym for Relying Party 3
302 RyP_4 acronym for Relying Party 4
330 STATUS_456789=11000
331 STATUS_456789=11000
332 Set-Cookie:
   STATUS_789012=00001
   In this case only the new session recording is sent back (existing STATUS XXX cookies are preserved in the browser)
333 Set-Cookie:
   STATUS_567890=00010
334 Cookies in the browser:
   STATUS_456789=11000
   STATUS_567890=00010
   STATUS_789012=00001
350 Need Authentication
351 Need Authentication 352 Silent (silent service 4)
353 Silent (silent service 5)
354 Get Session From Cookies
355 Get Session From Cookies
356 claim
357 claim
358 claim
359 Claim FIG. 4:
  410 upper part
  411 BROWSER
    Suppose that service 4 is already logged
  412 STATE_12_56_9=00010
  413 LOGIN (service 5)
  414 NODE1
    Register service 5
  415 STATE_12_56_9=00010
  416 STATE_2_15_33=00001
  417 LOGIN (service 1)
  418 NODE2
    Register service 1
  419 STATE_12_56_9=00010
  420 STATE_47_56_24=10000
  430 lower part
  431 BROWSER
    Suppose that logout is performed against another node
  432 STATE_12_56_9=00010
  433 STATE_2_15_33=00001
  434 STATE_47_56_24=10000
  435 RENEW
  436 IF MORE THAN ONE STATE COOKIE IS PRESENT THEY ARE AGGREGATED IN A NEWER ONE
  437 NODE3
    Service list is retrieved aggregating information with last state cookie
  438 STATE_66_10_51=10011
  439
  440
  441

The invention claimed is:

1. A method for managing a single sign on (SSO) session by an identity provider for a plurality of services, which comprises the following steps of:
  managing, via the identity provider, information on the SSO session via a cookie based protocol;
  persisting a list of session services of relying parties participating in a same SSO session in one session cookie and a plurality of temporary state cookies with randomly generated names, wherein the plurality of temporary state cookies persist information on the same SSO session, and wherein each of the plurality of temporary state cookies includes a bit mask indicating at least one of the session services in the list of session services, wherein the identity provider can dispatch session notifications to each relying party of the session; and
  consolidating the plurality of temporary state cookies into one state cookie in which the list of all session services in the same SSO session is represented with a bit mask representation.

2. The method of claim 1, wherein the bit mask representation is represented in a compressed format.

3. The method according to claim 1, wherein a SSO session state is saved via the cookies and can be recovered via the cookies and there is no need of persistency of a SSO session state at a server side.

4. The method according to claim 1, wherein session static information are represented as a signed ticket whereby both a ticket and signature are stored in separate cookies.

5. The method according to claim 1, wherein when a new relying party joins a global SSO session, the session cookie is updated by adding the new relying party into a list of global session participants.

6. The method of claim 1, which comprises deleting the plurality of temporary state cookies.

7. A non-transitory computer readable medium containing computer executable instruction for performing a method for managing a single sign on (SSO) session by an identity provider for a plurality of services, the method comprises the following steps of:
  managing, via the identity provider, information on the SSO session via a cookie based protocol;
  persisting a list of session services of relying parties participating in a same SSO session in one session cookie and a plurality of temporary state cookies with randomly generated names, wherein the plurality of temporary state cookies persist information on the same SSO session, and wherein each of the plurality of temporary state cookies includes a bit mask indicating at least one of the session services in the list of session services, and wherein the identity provider can dispatch session notifications to each relying party of the session; and
  consolidating the plurality of temporary state cookies into one state cookie in which the list of all session services in the same SSO session is represented with a bit mask representation.

8. The non-transitory computer readable medium according to claim 7, wherein the bit mask representation is represented in a compressed format.

9. The non-transitory computer readable medium according to claim 7, wherein a SSO session state is saved via the cookies and can be recovered via the cookies and there is no need of persistency of a SSO session state at a server side.

10. The non-transitory computer readable medium according to claim 7, wherein session static information are represented as a signed ticket whereby both a ticket and signature are stored in separate cookies.

11. The non-transitory computer readable medium according to claim 7, wherein when a new relying party joins a global SSO session, the session cookie is updated by adding the new relying party into a list of global session participants.

12. The non-transitory computer readable medium according to claim 7, wherein method comprises deleting the plurality of temporary state cookies.

* * * * *

UNITED STATES PATENT AND TRADEMARK OFFICE
CERTIFICATE OF CORRECTION

| | | |
|---|---|---|
| PATENT NO. | : 12,101,308 B2 | Page 1 of 1 |
| APPLICATION NO. | : 17/438171 | |
| DATED | : September 24, 2024 | |
| INVENTOR(S) | : Russo | |

It is certified that error appears in the above-identified patent and that said Letters Patent is hereby corrected as shown below:

In the Claims

Claim 7, Column 8, Lines 24-34 should read as follows:
persisting a list of session services of relying parties
    participating in a same SSO session in one session
    cookie and a plurality of temporary state cookies with
    randomly generated names, wherein the plurality of
    temporary state cookies persist information on the same
    SSO session, wherein each of the plurality of temporary
    state cookies includes a bit mask indicating at least one
    of the session services in the list of session services, and
    wherein the identity provider can dispatch session
    notifications to each relying party of the session; and Signed and Sealed this
Twenty-second Day of April, 2025

Coke Morgan Stewart
*Acting Director of the United States Patent and Trademark Office*